April 10, 1928.  H. S. MacCHESNEY  1,665,375
METHOD OF PRODUCING CLUTCH DRUMS
Filed May 6, 1927
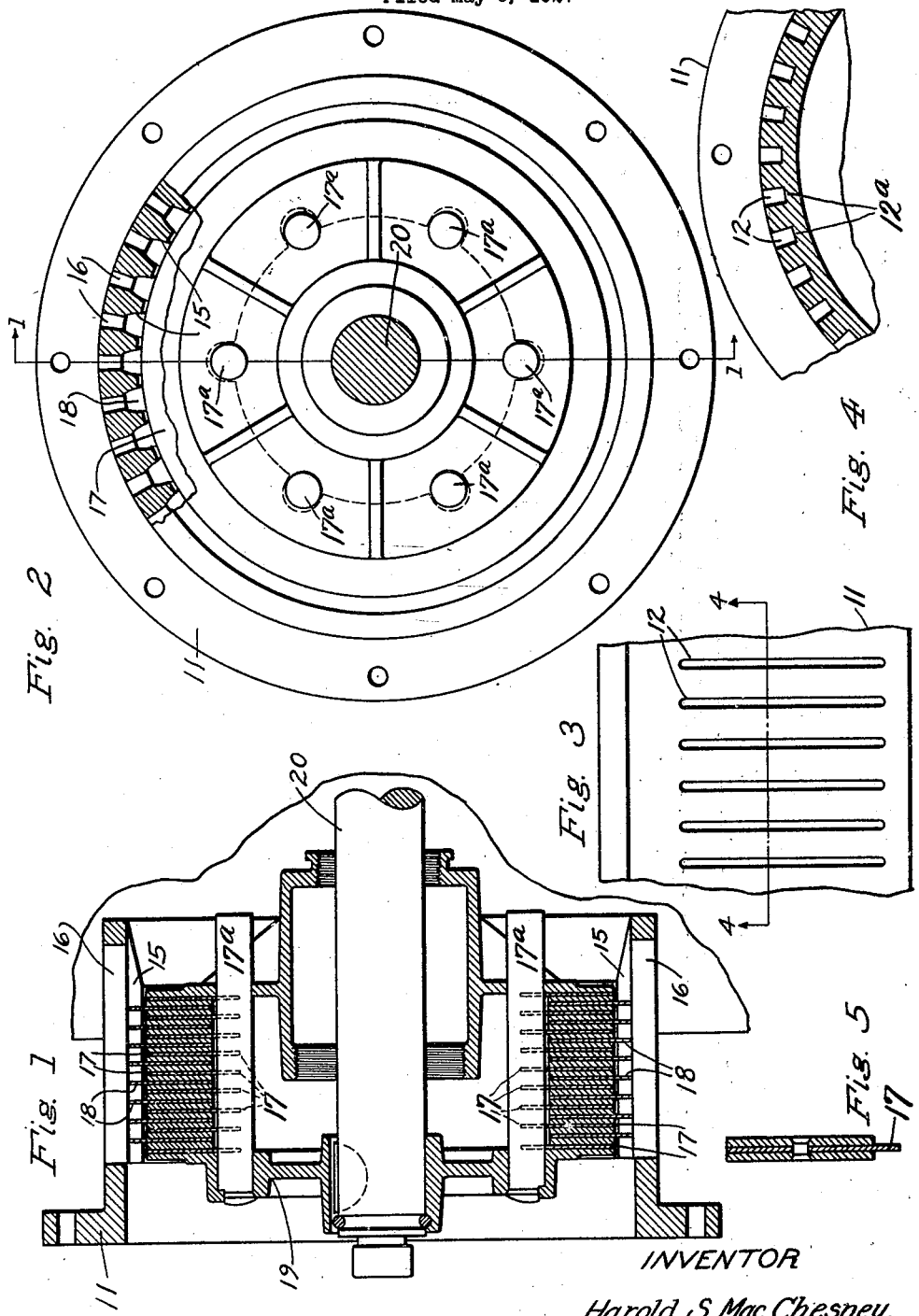

Patented Apr. 10, 1928.

1,665,375

UNITED STATES PATENT OFFICE.

HAROLD S. MacCHESNEY, OF NEW YORK, N. Y., ASSIGNOR TO AMERICAN CAR AND FOUNDRY COMPANY, OF NEW YORK, N. Y., A CORPORATION OF NEW JERSEY.

METHOD OF PRODUCING CLUTCH DRUMS.

Application filed May 6, 1927. Serial No. 189,293.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a vertical sectional view on line 1—1 of Fig. 2, illustrating a friction clutch whose clutch drum is produced through the instrumentality of my improved method;

Fig. 2 is an elevational view of the same showing parts broken away;

Fig. 3 is a fragmentary top plan view of the blank after the casting operation and from which the clutch drum is subsequently formed;

Fig. 4 is a fragmentary sectional view taken on line 4—4 of Fig. 3; and

Fig. 5 is a transverse sectional view of one of the friction clutch plates embodied in the assembly illustrated in Fig. 1.

This invention is a method for producing clutch drums for power clutches, and an object of the invention is to provide a simple and inexpensive method of producing these clutch drums embodying a few simple operations.

In accordance with the herein-described method, a cylindrical blank or casting 11 is first cast with spaced longitudinal peripheral grooves 12 whose ends stop short of the ends of the casting as shown best in Fig. 3.

The blank or casting 11 is then cleaned in any suitable manner, as by means of a rotating brush to remove all the molding sand from the slots 12. It is then locked in position in a suitable gear-cutting machine adapted to cut internal gear teeth, and the hub or gear-cutting tool is brought into action in such relation to the blank that the metal 12ª at the bottom of the grooves 12 is cut through by said cutting tool thereby forming the bevel-faced ribs 15 spaced apart by the longitudinally extending slots 16 as best shown in Fig. 2.

Thus the slots 16 and ribs 15 are formed by a combined casting and cutting process without the necessity of cutting through the major thickness of the drum to form ventilating slots as 16; and as the metal is cut for only a small part of its maximum thickness by the gear cutters, the drum is subjected to minimum stresses with the result that only a small percentage of finished drums are cracked in the process of production.

As illustrated in Figs. 1 and 2, the clutch assembly includes a plurality of friction disks 17 having spaced teeth meshing with the pins 17ª and cooperating plates having radial teeth 18 meshing with the teeth or ribs 15 and rotatable with a clutch member 19 fixed to a shaft 20. When the clutch plates are in frictional engagement, the clutch member 19 is rotated to drive the shaft 20 from the clutch drum through the instrumentality of the friction disks.

What is claimed is:

1. The method of forming clutch drums, consisting of casting a cylindrical blank with spaced grooves in its peripheral face, and subsequently cutting through the blank from its interior into all of such grooves to provide spaced longitudinal teeth upon the interior of the blank.

2. The method of producing internally toothed drive elements, consisting of forming a drive element blank with a plurality of spaced longitudinal grooves in its periphery, and subsequently cutting through the bottoms of the grooves to form spaced longitudinal internal teeth and a longitudinal air-inlet slot between each pair of teeth.

3. The method of producing clutch drums for friction disk clutches, consisting of casting a clutch drum blank with a plurality of longitudinal circumferentially spaced grooves, and subsequently cutting entirely through the blank and into each groove to produce spaced longitudinal teeth and an air-inlet slot between each two adjacent teeth through which air can pass.

4. The method of producing clutch drums, consisting of casting a clutch drum blank with a plurality of circumferentially spaced longitudinal grooves in its peripheral face, leaving an uninterrupted continuous metal wall upon the interior of the blank, and subsequently cutting through the continuous wall to form spaced longitudinal teeth upon its inner face and changing the grooves into longitudinal air-inlet slots, one of which slots is located between each two adjacent teeth.

In witness whereof I have hereunto set my hand.

HAROLD S. MacCHESNEY.